Aug. 15, 1944.   J. BOYD ET AL   2,356,027
BEARING ASSEMBLY
Filed Feb. 5, 1943
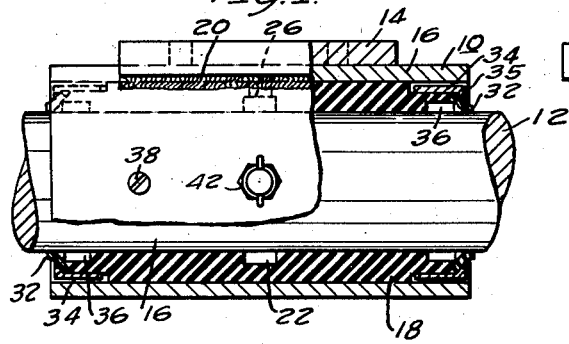
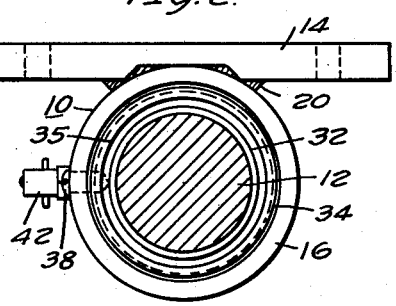
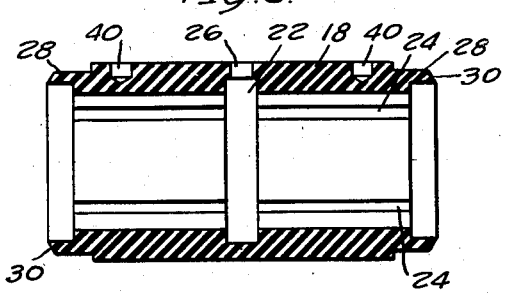
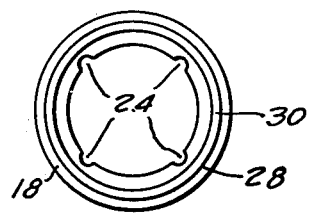
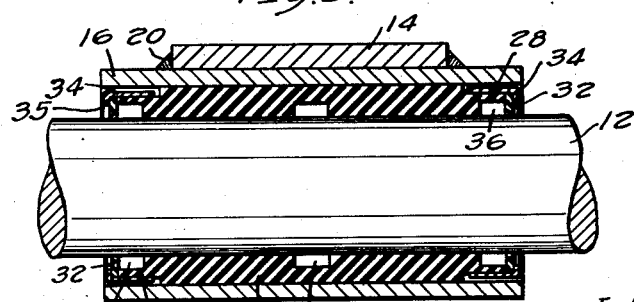
WITNESSES:
INVENTORS
John Boyd and
Phillip R. Eklund.
BY
ATTORNEY Patented Aug. 15, 1944

2,356,027

UNITED STATES PATENT OFFICE 2,356,027

BEARING ASSEMBLY

John Boyd, Forest Hills, and Phillip R. Eklund, Wilkinsburg, Pa., assignors to Westinghouse Electric & Manufacturing Company, East Pittsburgh, Pa., a corporation of Pennsylvania Application February 5, 1943, Serial No. 474,796

4 Claims. (Cl. 308—36.1)

This invention relates to bearing assemblies and in particular to grease-packed bearing assemblies.

In light surface craft, as, for example, "tank lighters" or the like which have been developed for use in shallow water for effecting landings from a mother boat, considerable difficulty has been encountered in obtaining satisfactory bearing assemblies. Where water lubricated bearings are utilized as the stern tube bearings of such light craft, considerable scoring of the shaft bearing is encountered with the result that only a relatively short bearing life can be obtained. Such scoring of the water lubricated bearing is found whenever the surface craft is operated close to shore, it being believed that the particles of abrasive material in the riled water adjacent the shore are responsible for such scoring. It has therefore become necessary to utilize grease-packed bearing assemblies for such duty in order to prolong the life of the bearings, and in particular the stern tube bearings.

The known grease-packed bearing assemblies have one or more disadvantages. In some assemblies, the lubricating channels are not arranged to transmit the lubricant uniformly to the bearing surface. In other assemblies utilizing seals, the bearing proper has to be mounted in operative position with respect to the shaft before the seals can be secured in place. In substantially all of the sealed assemblies there are a number of parts which have to be removed in order to remove the bearing in making repairs, such parts being easily damaged or lost in ship yards or aboard the mother ship where repairs are usually made.

It is an object of this invention to provide a sealed bearing assembly which is rugged in construction, economical in design and maintenance, and has a long life.

Another object of this invention is to provide a grease-packed bearing assembly having a bearing and seals therefor which are readily removed from the assembly as an integral unit.

Other objects of this invention will become apparent from the following description when taken in conjunction with the accompanying drawing in which:

Figure 1 is a view in elevation and partly in section of a bearing assembly embodying the teachings of this invention;

Fig. 2 is an end view of the assembly of Fig. 1;

Fig. 3 is a view in section of the sleeve bearing utilized in the assembly of Fig. 1;

Fig. 4 is an end view of the sleeve bearing shown in Fig. 3, and

Fig. 5 is a view in section of another embodiment of this invention.

Referring to the drawing and in particular to Figs. 1 and 2, this invention is illustrated by reference to a bearing assembly 10 employed in conjunction with a shaft 12 which is to be rotated therein. The bearing assembly 10 comprises in general a base plate 14, a metallic sheath or sleeve 16, and a tubular sleeve bearing member 18 mounted within the sleeve 16. The base member 14 may be of any general construction suitable for mounting the assembly in fixed position for receiving the shaft 12. The metallic sheath or sleeve 16 is of any suitable metal, preferably a metal which is resistant to the action of sea water, and is secured to the base member 14 in any suitable manner or as illustrated in Fig. 2 as by means of a weld 20 when the sleeve 16 seats within a groove provided in the base member 14.

A tubular bearing member 18 is preferably formed of fibrous material such as cloth or paper impregnated with a resinous binder and consolidated under heat and pressure into an integral unit. The resinous binder may be a phenolic condensation product or any other suitable binder material. As illustrated in Figs. 3 and 4, the tubular member 18 has its inner surface machined in a predetermined manner to provide a plurality of lubricating grooves in the bearing surface of the member. A radial groove 22 is provided intermediate the ends of the tubular member, the radial groove being traversed by a plurality of substantially evenly spaced longitudinal grooves 24 which extend between the ends of the tubular member. As illustrated, the radial groove 22 is provided with a duct 26 for providing communication between the grooves and the outer surface of the tubular member 18.

In order to provide radial grooves at the ends of the tubular member 18, as will be described more fully hereinafter, the tubular member 18 terminates in flanges or sections 28 which extend in a longitudinal direction away from the main body of the tubular member 18 intermediate of its inner and outer surfaces. The outer ends of the flanges or sections 28 are preferably beveled as illustrated at 30, the purpose of which will be explained more fully hereinafter.

Again referring to Fig. 1, there is illustrated a flexible seal 32 at each end of the tubular member 18. The flexible seal preferred to be utilized in this invention is formed of an oil resistant elastomer, namely synthetic rubber, such material having an extremely long life for this particular application. The elastomers, polychlorobutadiene, known to the trade as Neoprene, and polyisobutylene or the modified isobutylene synthetic rubbers have proven to be satisfactory. An elastomer which has been found to have unusual long life in this application is a particular soft artificial rubber manufactured by the Standard Oil Company and sold to the trade as butyl rubber compound No. 1612. These examples of the elastomers will illustrate the types of material which are satisfactory for the purpose of sealing the bearing member 18, but, however, are not to be construed as limiting the type of synthetic rubber which can be utilized in effecting the sealing of the bearing member.

The flexible seal 32 is preferably of a disk shape and is so positioned, as illustrated in Fig. 1, as to have one end seat on the beveled end 30 of the flange or section 28 and to extend away therefrom in an angular direction to effect a wiping contact with the shaft 12. As illustrated, the flexible seal 32 is of a size larger than necessary to contact the shaft 12 whereby a side of the seal 32 adjacent the free end thereof is in wiping contact about the shaft member. With this construction, it is found that the flexible seal will have an unusually long life, for, if the contacting surface of the seal is worn, the seal continues to be biased into wiping engagement with the shaft 12.

In order to retain the seal 32 in the position just described, a flange ring 34 is disposed about the flange or section 28, preferably as by means of a press fit. The flange portion 35 of the ring flange 34 projects inwardly to a point beyond the flange section 28 of the bearing member 18 and is provided with an inner side surface beveled for cooperating with the beveled end 30 of the section 28 for maintaining the flexible seal 32 seated in assembled position. The edge of the inwardly projecting flange portion 35 is maintained in engagement with the angularly extending mounted seal 32. As will be apparent from the drawing, the flange ring 34 functions to tend to bias the seal 32 into tight engagement with the shaft member 12 to maintain the seal with the shaft.

When thus held in position on the beveled end of the flange or section 28, the flexible seal 32 cooperates with the tubular member 18 and the section 28 carried thereby to provide a radial groove 36 at the end of the tubular member 18. As clearly illustrated in Fig. 3, each of the radial grooves 22 and 36 is in communication with the longitudinal grooves 24, so that an even distribution of lubricant when supplied to the bearing will be effected over the entire bearing surface.

The tubular member 18 carrying the flexible seals 32 at the ends thereof is readily mounted in an operative position within the metallic sheath or sleeve 16 by means of setscrews 38 which project through the sheath 16 into recesses 40 provided in spaced relation on the outer surface of the tubular member 18. As illustrated in Fig. 2, an Alemite fitting 42 of well known construction is so carried by the metallic sheath 16 as to be in communication with the duct 26 of the tubular member 18. Although not illustrated, a reservoir in which a lubricant is mounted under pressure may be carried by the base member 14 to be connected to the Alemite fitting 42 for maintaining the lubricant in the grooves of the bearing 18 at all times when the bearing is mounted in operative relation with respect to the shaft 12. However, in actual practice it is found that after the bearing is mounted in operative relation with the shaft 12 and secured in position in the sheath 16, a single packing of a lubricant such as grease in the grooves of the bearing will provide a sufficiently long life for a considerable operation of the surface craft with which the bearing assembly is to be employed.

The tubular member 18 carrying the flexible seals 32 can be readily removed from the metallic sheath 16 by the simple operation of releasing the setscrews 38 and pulling the bearing member from its mounting. Likewise, in assembling the tubular member 18 carrying the seals, it is quite easy to mount the tubular member 18 in its operative position by simply sliding the tubular member over the shaft until it is in the required position. If the shaft is greased slightly prior to forcing the tubular member 18 into its operative position, it is found that the tubular member can readily be assembled with the seals 32 in the positions as illustrated.

In another embodiment of this invention as illustrated in Fig. 5, the flexible seals 32 are illustrated as being perpendicular to the shaft 12. In this embodiment the flexible seals 32 are also seated against the end of the flange or section member 28 formed as an integral part of the tubular member 18 by means of a ring flange 34. In this embodiment the end of the flange section 28 and the flange portion of the ring flange 34 are not beveled, so that the seal 32 is maintained in a position substantially perpendicular to the shaft 12. As illustrated, the free end of the flexible seal 32 is preferably beveled so as to give a substantially knife edge wiping contact with the shaft member 12.

The lubricating grooves formed in the tubular member 18 are similar to the lubricating grooves formed in the embodiment illustrated in Fig. 1, each of the grooves being in communication with one another and with the Alemite fitting (not shown) which is carried by the metallic sheath 16. Similarly, the perpendicular flexible seals 32 of the embodiment shown in Fig. 5 cooperate with the tubular member 18 and the section 28 carried thereby in forming radial grooves 36 at the ends of the tubular member 18.

With the lubricating grooves packed with grease or other suitable lubricant, it is found that in practice the pressure of water against the outer surfaces of the flexible seals 32 is sufficient for maintaining the flexible seal 32 in wiping contact engagement with the shaft 12. However, as will be apparent, the flexible seal shown in the embodiment of Fig. 1 will have a longer life than that of the flexible seal shown in the embodiment of Fig. 5, since the flexible seal of Fig. 5 will have a constant edge wear without a reserve of material which can be biased into engagement with the shaft 12. However, where a soft synthetic rubber is employed as the flexible seal of the embodiment of Fig. 5, it is found that a sufficient life is obtained to justify the simpler construction of the embodiment of the invention illustrated in Fig. 5.

As will be apparent, the bearing assembly of this invention is simple but quite rugged in construction. By reason of the spaced lubricating grooves, it is possible to provide lubrication over the entire surface of the bearing, the flexible seals maintaining the lubricant in the grooves while at the same time being effective for preventing the admission of water to the lubricating grooves. Repairs are readily made to the assembly since the bearing and the flexible seals therefore can be removed or installed from the metallic supporting sheath as an integral unit without the danger of losing or damaging the parts removed.

Although this invention has been described with reference to a particular embodiment thereof, it is, of course, not to be limited thereto except in so far as is necessitated by the scope of the appended claims.

We claim as our invention:

1. In a bearing assembly for a shaft member, in combination, a tubular member of fibrous material impregnated with a resinous binder, a longitudinally extending flange portion carried by each of the ends of the tubular member intermediate of the inner and outer surfaces of said member, lubricating grooves disposed in the tubular member, the lubricating grooves being open in the inner surface of the tubular member to engage the shaft member, a flexible seal positioned at the end of each of the flange members disposed to cooperate with each of the associated tubular and flange members to form a radial lubricating groove at each end of the tubular member, the flexible seal having a free end disposed to be in wiping contact about the shaft member, a flanged ring member disposed about each of the longitudinally extending flange members for maintaining the seal associated therewith in cooperating relation with the tubular member disposed for movement therewith, a metallic sheath disposed about the tubular member for reinforcing said member and provide a mounting therefor and means for releasably retaining the tubular member carrying the seals in fixed mounted relation in the metallic sheath.

2. In a bearing assembly for a shaft member, in combination, a tubular member of fibrous material impregnated with a resinous binder, a longitudinally extending flange portion carried by each of the ends of the tubular member intermediate of the inner and outer surfaces of said member, lubricating grooves disposed in the tubular member, the lubricating grooves being open in the inner surface of the tubular member to engage the shaft member, a flexible seal positioned at the end of each of the flange members disposed to cooperate with each of the associated tubular and flange members to form a radial lubricating groove at each end of the tubular member, the flexible seal being an oil resistant elastomer material, the flexible seal having a free end disposed to be in wiping contact about the shaft member, a flanged ring member disposed about each of the longitudinally extending flange members for maintaining the seal associated therewith in cooperating relation with the tubular member disposed for movement therewith, a metallic sheath disposed about the tubular member for reinforcing said member and provide a mounting therefor, and means for releasably retaining the tubular member carrying the seals in fixed mounted relation in the metallic sheath.

3. In a bearing assembly for a shaft member, in combination, a tubular member of fibrous material impregnated with a resinous binder, the tubular member having relatively thin longitudinal sections extending from the ends thereof intermediate of the inner and outer surfaces of the tubular member, each of the sections having a beveled outer end, lubricating grooves disposed in the tubular member, the lubricating grooves being open in the inner surface of the tubular member to engage the shaft member, a flexible seal for each end of the tubular member, each of the seals being disposed to so seat on the beveled end of one of the sections as to extend therefrom in an angular direction to effect a wiping contact about the shaft member, the flexible seals cooperating with the tubular member to form a radial lubricating groove at each end of the tubular member, means for retaining each of the flexible seals seated on the beveled end of its associated section disposed for movement with the tubular member, a metallic sheath disposed about the tubular member to provide a mounting therefor, and means for releasably retaining the tubular member carrying the seals in fixed mounted relation in the metallic sheath.

4. In a bearing assembly for a shaft member, in combination, a tubular member of fibrous material impregnated with a resinous binder, the tubular member having relatively thin longitudinal sections extending from the ends thereof intermediate of the inner and outer surfaces of the tubular member, each of the sections having a beveled outer end, lubricating grooves disposed in the tubular member, the lubricating grooves being open in the inner surface of the tubular member to engage the shaft member, a flexible seal for each end of the tubular member, the flexible seal being an oil resistant elastomer material, each of the seals being disposed to so seat on the beveled end of one of the sections as to extend therefrom in an angular direction to effect a wiping contact about the shaft member, the flexible seals cooperating with the tubular member to form a radial lubricating groove at each end of the tubular member, means for retaining each of the flexible seals seated on the beveled end of its associated section disposed for movement with the tubular member, a metallic sheath disposed about the tubular member and seals to provide a mounting therefor, and means for releasably retaining the tubular member carrying the seals in fixed mounted relation in the metallic sheath.

JOHN BOYD.
PHILLIP R. EKLUND.